United States Patent
Dantressangle et al.

(10) Patent No.: US 10,169,437 B2
(45) Date of Patent: Jan. 1, 2019

(54) TRIPLESTORE REPLICATOR

(71) Applicant: International Business Machines Corporation, Armonk, NY (US)

(72) Inventors: Patrick Dantressangle, Hampshire (GB); Charles D. Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 14/485,714

(22) Filed: Sep. 13, 2014

(65) Prior Publication Data

US 2015/0120643 A1  Apr. 30, 2015

(30) Foreign Application Priority Data

Oct. 30, 2013 (GB) .................................. 1319134.1

(51) Int. Cl.
*G06F 7/00* (2006.01)
*G06F 17/00* (2006.01)
*G06F 17/30* (2006.01)

(52) U.S. Cl.
CPC .. *G06F 17/30575* (2013.01); *G06F 17/30289* (2013.01); *G06F 17/30563* (2013.01)

(58) Field of Classification Search
CPC ......... G06F 17/30563; G06F 17/30569; G06F 17/30575; G06F 17/30581; G06F 17/30595; G06F 17/30604; G06F 17/30289; G06F 17/30917
USPC ................ 707/602, 610, 791, 793, 795–796, 707/802–803
See application file for complete search history.

(56) References Cited

U.S. PATENT DOCUMENTS

| | | | |
|---|---|---|---|
| 8,037,108 B1* | 10/2011 | Chang ................... | G06F 17/303 707/803 |
| 8,412,720 B2 | 4/2013 | Britton et al. | |
| 8,489,649 B2* | 7/2013 | Yalamanchi ...... | G06F 17/30312 707/809 |
| 2002/0059566 A1* | 5/2002 | Delcambre ......... | G06F 17/2264 717/146 |
| 2004/0210552 A1 | 10/2004 | Friedman et al. | |

(Continued)

OTHER PUBLICATIONS

Sequeda et al. "Relational Database to RDF Mapping Patterns" Department of Computer Science, The University of Texas at Austin 3rd Workshop on Ontology Patterns Nov. 2012.*

(Continued)

*Primary Examiner* — Jason G Liao
*Assistant Examiner* — Berhanu Mitiku
(74) *Attorney, Agent, or Firm* — Steven M. Greenberg, Esq.; Shutts & Bowen LLP

(57) ABSTRACT

This invention relates to a system, method and computer program product for replicating triplestore data from generic data records including: a plurality of triplestore mapping operations; a record reader for listening for data events from the generic data record and for matching each data event to one or more triplestore mapping operations; a processor for generating equivalent triples for each located data event by applying the matched triplestore mapping operation; and a data sink for receiving generated equivalent triples so that the triplestore data is synchronized in real time with the generic data records.

15 Claims, 4 Drawing Sheets

(56) References Cited

U.S. PATENT DOCUMENTS

2011/0238610 A1    9/2011  Lee et al.
2012/0102022 A1    4/2012  Miranker et al.

OTHER PUBLICATIONS

Author Unknown; "Step 3: Converting Relational Data to RDF"; [retrieved Jul. 5, 2013]; http://db.disi.unitn.eu/pages/Rel2RDFTutorial2011/S3.pdf.
Konstantinou, Nikolaos, et al.; "Exposing Scholarly Information as Linked Open DAta: RDFizing DSpace contents"; [retrieved Jul. 5, 2013]; http://www.cn.ntua.gr/~nkons/r2rml_parser-2013_post_peer-review.pdf.
Ramanujam, Sunitha et al.; "Update-Enabled Triplification of Relational Data into Virtual RDF Stores"; International Journal of Semantic Computing, vol. 4, No. 4; Dec. 2010, pp. 423-451.
Sequeda, Juan et al.; "Relational Database to RDF Mapping Patterns"; 3rd Workshop on Ontology Patterns (WOP2012) at ISWC 2012; Nov. 2012; all pages.
Zhan, Yucheng M., "Updating RDF", 21st Computer Science Seminar, Apr. 2005, pp. SD2-T3-1 through SD2-T3-7.

\* cited by examiner

TRIPLESTORE REPLICATOR

BACKGROUND

Field of the Invention

This invention relates to a method and apparatus for replicating data record events in a triplestore database in real-time. In particular this relates to a method and apparatus for populating a resource description framework (RDF) triplestore through a real-time mapping engine.

A triplestore is a purpose-built database for the storage and retrieval of triples, a triple being a data entity composed of subject-predicate-object, like "John is 21" or "John knows Ted". Much like a relational database, one stores information in a triplestore and retrieves it via a query language. Unlike a relational database, a triplestore is optimized for the storage and retrieval of triples. In addition to queries, triples can usually be imported/exported using resource description framework (RDF) and other formats.

One way of replicating data as a triplestore is to use a complex extract transform load (ETL) batch jobs on the data to find, extract, transform and load the changes into a triplestore.

Another approach is to monitor data and use broker flows to transform the changes. It is possible to monitor data using change data capture (CDC) techniques. Change data capture (CDC) is a set of software design patterns used to determine (and track) data that has changed so that action can be taken using the changed data.

Relational database to resource descriptor framework mapping language (R2RML) is a language for expressing customized mappings from relational databases to RDF datasets. Such mappings provide the ability to view existing relational data in the RDF data model, expressed in a structure and target vocabulary of the mapping author's choice. R2RML mappings are themselves RDF graphs. R2RML enables different types of mapping implementations.

D2RQ is a system for accessing relational databases as virtual, read-only RDF graphs. It offers RDF based access to the content of relational databases without having to replicate it into an RDF store. Using D2RQ: a non-RDF database can be queried; the content of a database as linked data over the Web can be accessed; custom dumps of the database in RDF formats for loading into an RDF store can be created; and information in a non-RDF database can be accessed.

Current R2RML or D2RQ technologies, and the R2RML standard definition (www.w3.org/2001/sw/rdb2rdf/test-cases/) allows for reading data from relational database system (RDBMS) to expose virtual triples. Neither of these technologies pick up data events occurring at RDBMS system level (for example: insert; update and delete) and cannot be used to populate a RDF triple store in near real-time.

BRIEF SUMMARY OF THE INVENTION

In a first aspect of the invention there is provided a system for replicating triplestore data from a generic data record comprising: a plurality of triplestore mapping operations; a record reader for listening for data events from the generic data record and for matching each data event to one or more triplestore mapping operations; a processor for generating equivalent triples for each located data event by applying the matched triplestore mapping operation; and a data sink for receiving generated equivalent triples so that the triplestore data is synchronized in real time with the data record.

In a second aspect of the invention there is provided a method of replicating a triplestore data from a generic data record comprising: listening for data events from the generic data record; matching each data event to a triplestore mapping operation; generating equivalent triples for each located data event by applying the triplestore mapping operation; and pushing equivalent triples into a triplestore data sink so that the triplestore data is synchronized in real time with the data record.

A real time solution is required when strict compliance and verification is needed. For example, customers like banks and government organizations have a need to query triplestore databases for auditing to provide a real-time picture of existing data records.

The embodiments push all changes from remote data records into a single triplestore in real-time. Semantic queries can then be executed on this real-time representation of all data assets. Real-time in this specification is soft-real time, that is as fast as possible and as close as real time as possible but not necessarily absolutely constrained. Therefore it is not necessarily based on interruption with time/resources constraints.

The embodiments have a quickening effect on any processes that rely on a triplestore database. The embodiments operate at system level of a computer system and below an overlying application level. The embodiments increase the reliability of applications since real-time data is the most up-to-date.

Similar queries using R2RML or D2RQ engines would put extra load on a RDBMS. Furthermore security risks would be introduced by allowing an extra RDF or RDF query language (SPARQL) application to access the RDBMS.

Advantageously the triplestore database comprises one of: a triplestore data sink; or a triplestore database system.

A further replication sink is advantageous because of pre-existing transformation capabilities, that is: ETL normalization (for instance for IBM DataStage); message queue fan out to multiple RDF stores (for instance for IBM MQ or Java Message System); and multiple RDF save replicas. IBM DataStage is an ETL system. IBM MQ is a messaging system that uses queues to transfer messages between connected systems. IBM, DataStage and MQ are registered or unregistered trademarks of International Business Machines in the US and/or other countries. Java is a registered or unregistered trademark of Oracle Corporation in the US and/or other countries.

More advantageously, two or more triples are created for each data event according to user defined R2RMI mapping.

Still more advantageously, the data event is one or more of: an insert event; a delete event; or an update event.

Yet more advantageously, triplestore data is injected into the triplestore storage using a known application programming interface (API). For instance, one such triplestore API is the Apache Jena framework. Apache Jena is an open source Java framework for building semantic Web and linked data applications.

Preferably data events include events from one or more of the following: database replication; data modification; change data capture (CDC) events; events from platform messaging systems; events from event load transfer (ELT) systems; and events from structured query language (SQL) replication.

More preferably the method is scaled for listening to multiple data event sources simultaneously. The method uses fast or parallel processors. Data event sources can be pushing thousands of events per second. One data record change can generate multiple triples or triple changes (at least one per file in the record plus types and others relevant concepts defined by the R2RML mapping). Therefore the R2RML transformations need to be nimble, for example, pre-calculated as templates in memory, so that data from before and after record images is transformed as efficiently as possible into the mappings. Mapping needs to be applied in parallel as efficiently as possible, for example, by loading the RDF model graph in memory and then persisting it all at once.

In a third aspect of the invention there is provided a computer program product for replicating information from a relational database as a triplestore database, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a computer, comprising software code portions, when said program is run on a computer, for performing all the steps of the method claims.

In a fifth aspect of the invention there is provided a data carrier aspect of the preferred embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

BRIEF DESCRIPTION OF THE DRAWINGS

Preferred embodiments of the present invention will now be described, by way of example only, with reference to the following drawings in which.

DETAILED DESCRIPTION OF THE EMBODIMENTS

Figure 1A:
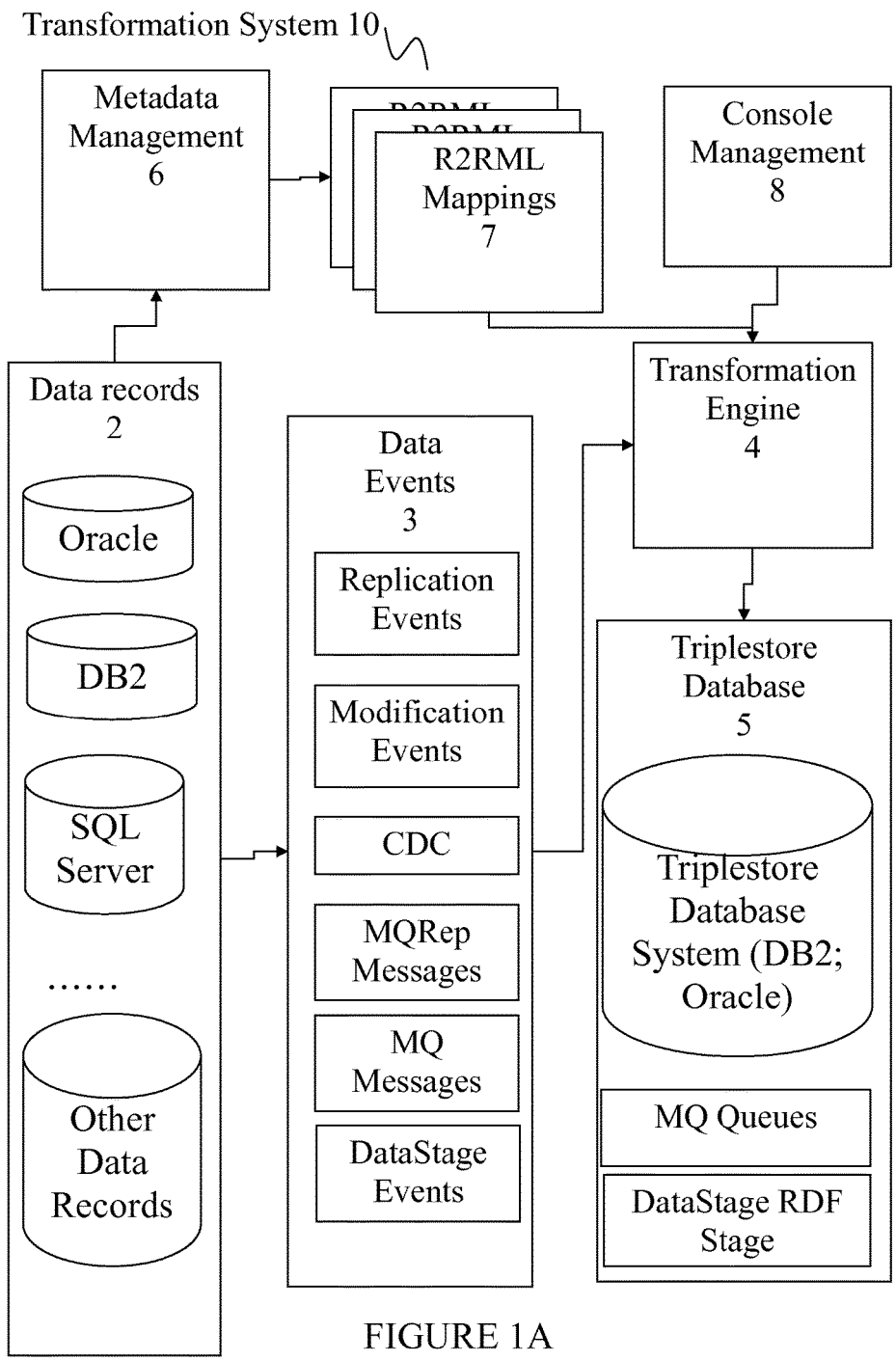
FIG. 1A is a schematic deployment diagram of a transformation system of the preferred embodiment.

Referring to FIG. 1A, the deployment of a preferred embodiment is shown. Transformation system 10 comprises: data records 2; data events 3; transformation engine 4; triplestore database 5; metadata management 6; R2RML mappings 7 and console management 8.

Data records 2 are the source of the data events that are intercepted by the preferred embodiment. Data records 2 are designed for use by external systems but these external systems are not part of the embodiments. Data records 2 can comprise: Oracle databases; IBM DB2 databases; SQL Servers; or any other data records including simple data tables or extensible mark-up language (XML) data.

Data events 3 are intercepted and are piped to transformation engine 4.

Transformation engine 4 is for transforming the data events into triplestore data and is described in more detail below.

Triplestore database 5 is for receiving the transformed data events from RDF message queues or ELT RDF stages or any other type of record feed into a triplestore database.

Metadata management 6 is for creating triplestore transformation mappings between data events that might occur for data records 2 and equivalent triplestore data. These mappings are stored in R2RML mappings 7.

R2RML mappings 7 are for storing the transformational mappings between data events and triplestore data. The transformation engine 4 fetches individual R2RML mapping for use in the transformation.

Console management 8 is used by administrators to operate and manage transformation engine 4.

Figure 1B:
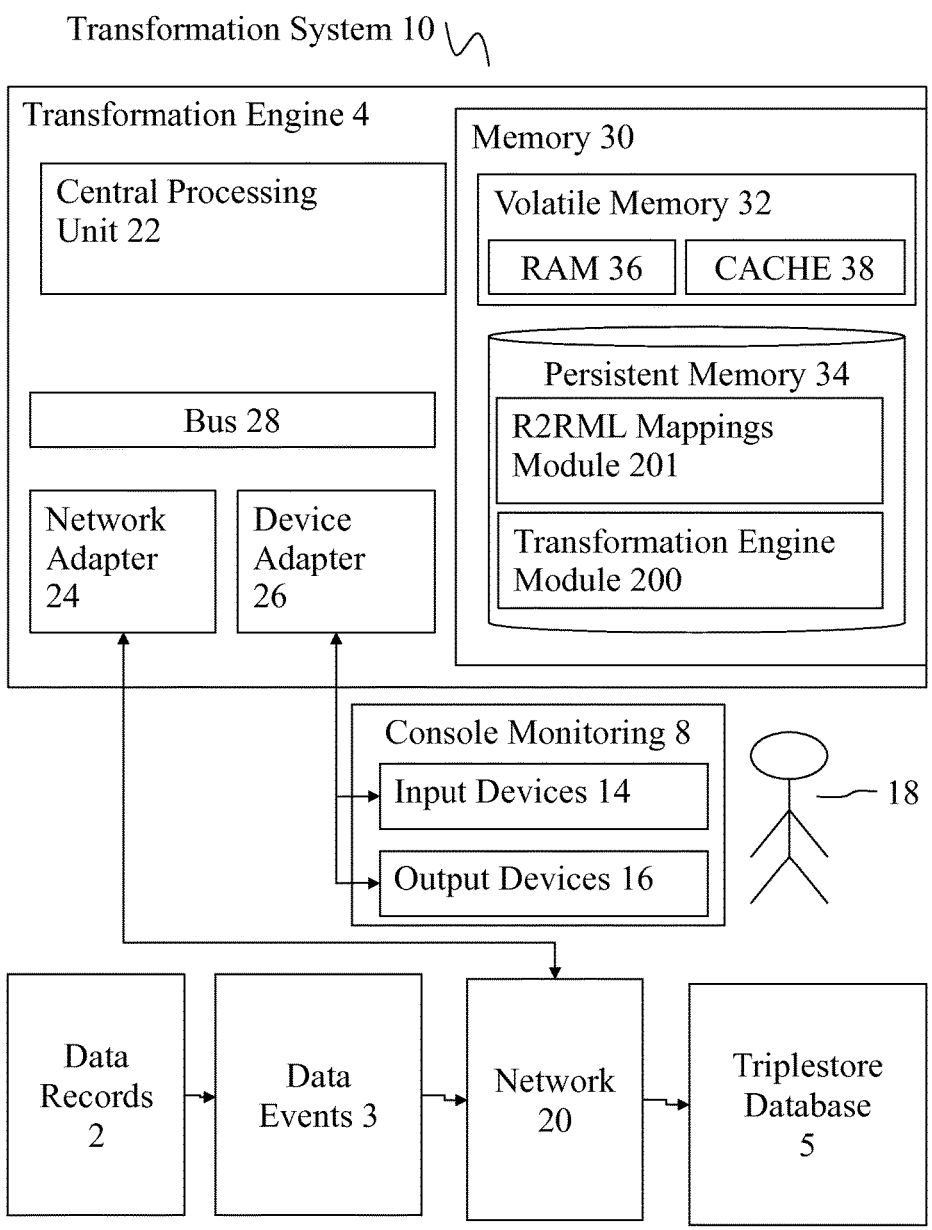
FIG. 1B is a computer based deployment of the transformation of the preferred embodiment.

Referring to FIG. 1B, the deployment of a preferred embodiment in a computer system is described. Transformation system 10 is operational with numerous other general purpose or special purpose computing system environments or configurations. Examples of well-known computing processing systems, environments, and/or configurations that may be suitable for use with transformation system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Transformation system 10 may be described in the general context of computer system-executable instructions, such as program modules, being executed by a computer processor. Generally, program modules may include routines, programs, objects, components, logic, and data structures that perform particular tasks or implement particular abstract data types. Transformation system 10 may be embodied in distributed cloud computing environments where tasks are performed by remote processing devices that are linked through a communications network. In a distributed cloud computing environment, program modules may be located in both local and remote computer system storage media including memory storage devices.

Console management 8 includes one or more input devices 14 and output devices 16 directly attached to the transformation engine 4. Transformation system 10 is connected to a network 20. Transformation system 10 communicates with a user 18 using input devices 14 and output devices 16. Input devices 14 include one or more of: a keyboard, a scanner, a mouse, trackball or another pointing device. Output devices 16 include one or more of a display or a printer. Transformation system 10 communicates with network devices (not shown) over network 20. Network 20 can be a local area network (LAN), a wide area network (WAN), or the Internet.

Transformation engine 4 is based on a general purpose computer and comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in register (not shown); transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is a machine code program; the machine code program is written in machine code language which is a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the transformation engine 4 and network devices.

Device adapter 26 is connected to bus 28 and input devices 14 and output devices 16 for enabling communication between transformation engine 4 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Transformation system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention The set of program modules configured to carry out the functions of the preferred embodiment comprises transformation engine module 200 and R2RML mappings module 201. Further program modules that support the preferred embodiment but are not shown include firmware, boot strap program, operating system, and support applications. Each of the operating system, support applications, other program modules, and program data or some combination thereof, may include an implementation of a networking environment.

Transformation system 10 communicates with at least one network 20 (such as a local area network (LAN), a general wide area network (WAN), and/or a public network like the Internet) via network adapter 24. Network adapter 24 communicates with the other components of transformation engine 4 via bus 28. It should be understood that although not shown, other hardware and/or software components could be used in conjunction with transformation system 10. Examples, include, but are not limited to: microcode, device drivers, redundant processing units, external disk drive arrays, redundant array of independent disks (RAID), tape drives, and data archival storage systems.

Figure 2:
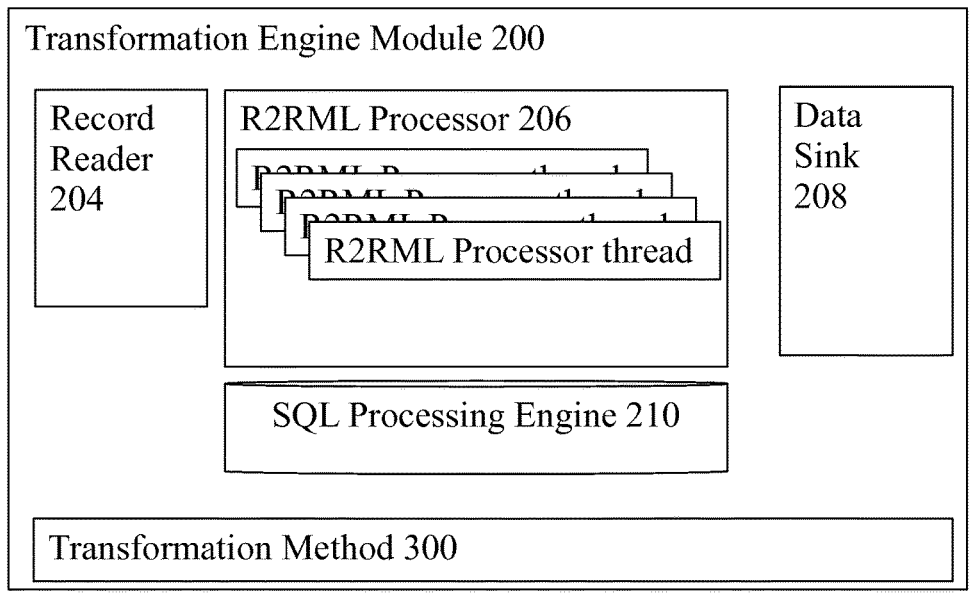
FIG. 2 is a component diagram of the preferred embodiment.

Referring to FIG. 2, transformation engine module 200 comprises the following components: record reader 204; R2RML processor 206; data sink 208; SQL (sequence query language) processing engine 210; and transformation method 300.

Record reader 204 is for reading the record data and fetching one or more R2RML mapping files. Record reader 204 is also for gathering metadata from the record data; this information can be read from a configuration file, metadata server or as extra annotations in previously mentioned R2RML mapping file. Record reader 204 is also for gathering runtime parameters from the record data; for example: multiple sections; concurrent threads; logging data; RDF store connection parameters; metadata server connection parameters; MQ Broker connection and subscriptions; and CDC connection parameters. The record data, mapping files, metadata and parameters are passed onto R2RML processor 206.

R2RML processor 206 is for operating on the record data, mapping files, metadata and parameters to effect a transformation of the record data. R2RML processor 206 accepts the following inputs: before and after images of database records; the SQL operation types INSERT, DELETE, UPDATE; and table definitions. This component manages triple creation based on the R2RML mapping definitions. If the R2RML logical table definition in the R2RML file is a simple expression with no SQL then the mapping into multiple triples is done in memory directly. If the R2RML logical table definition in the R2RML file uses SQL (using a SELECT statement for instance) then R2RML processor 206 call SQL processing engine 210.

Data sink 208 is a buffering triplestore for taking all the triples generated by R2RML processor 206 and doing one or more of the following: 1) Using a SPARQL JENA API to inject triples directly into the RDF store; 2) Using an ELT stage to push triples in an RDF store; 3) Using a platform messaging queue to push triples to publish and subscribe listeners; or 4) Using CDC listeners to push the triples to other replicated triple stores.

SQL processing engine 210, (for example an embedded Apache Derby database) is used for the sole purpose of processing the SQL statements by replacing the tables names in the FROM clause ("FROM TABLE1") with "VALUES ('field1', 'field2', . . . 'fieldN') as TABLE1 (fieldname1, fieldname2, . . . fieldnameN)" clauses so that the SQL processing engine can process triples without a real table created on disk (for speed and agility purposes). Apache Derby, a database subproject of the Apache code community, is an open source relational database implemented entirely in Java and available under the Apache License, Version 2.0. Apache Derby is particularly useful if the R2RML SQL statement specified use CASE statements or any static reference data tables (for example currencies or countries). Eventually, if the reference data set is large, reference data tables can be loaded in the in-memory SQL processing engine if they fit, or as usual SQL processing engine tables with persistence if more data is required and this cannot all fit in memory.

Figure 3:
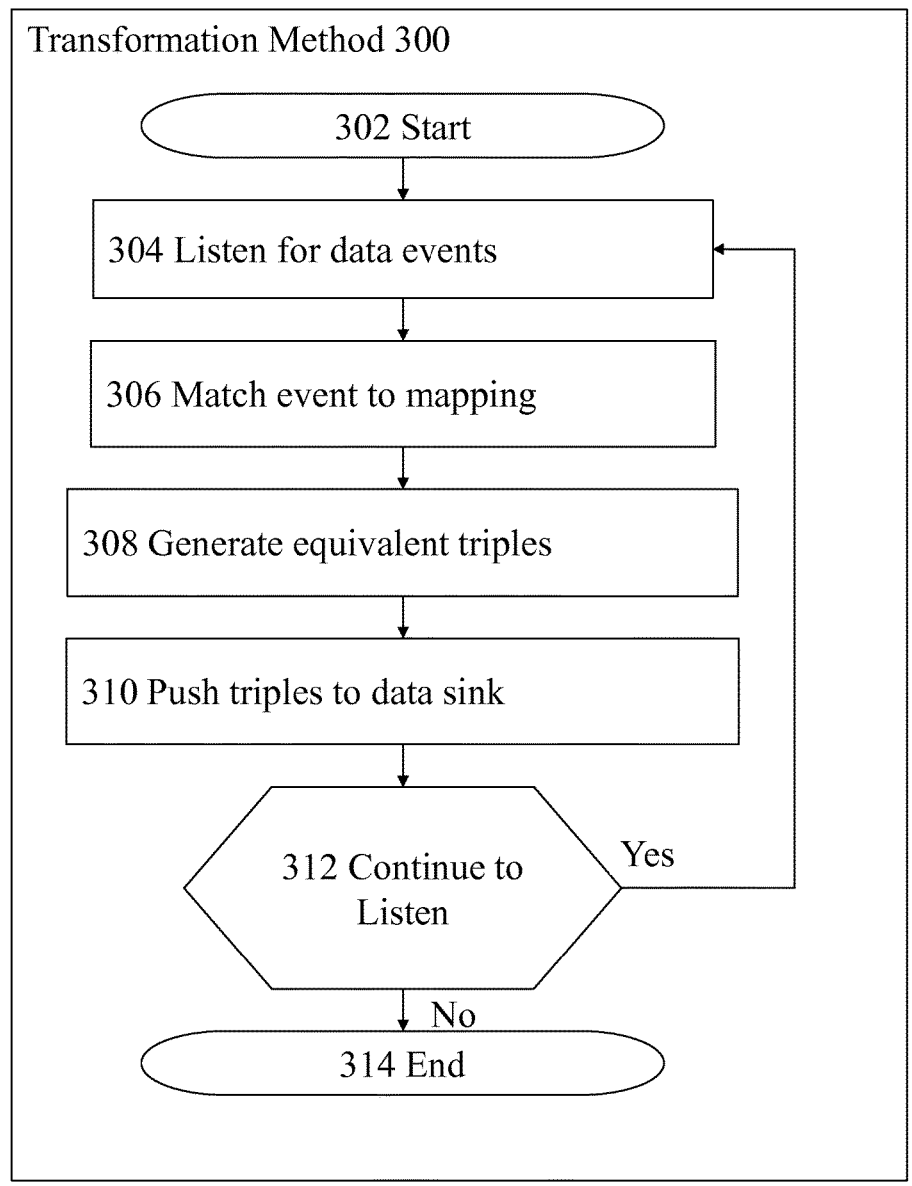
FIG. 3 is a flow diagram of a process of the preferred embodiment.

Referring to FIG. 3, transformation method 300 comprises logical process steps 302 to 314.

Step 304 is for listening for data events.

Step 306 is for matching event data to mapping transformations.

Step 308 is for generating equivalent triples.

Step 310 is for pushing triples to the data sink.

Step 312 is for deciding to continue to listen for data events at step 304 else step 314.

Step 314 is the end of transformation method 300.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

It will be clear to one skilled in the art that many improvements and modifications can be made to the foregoing exemplary embodiment without departing from the scope of the present invention.

What is claimed is:

1. A system for replicating triplestore data from generic data records comprising:
    a computing processor; and
    a computer readable medium having program instructions embodied therewith, the program instructions executable by the computing processor to cause the computing processor to implement:
    a plurality of triplestore mapping operations;
    a record reader for listening for data events from the generic data record and for matching each data event to one or more triplestore mapping operations;
    a processor for generating equivalent triples for each located data event by applying the matched triplestore mapping operation, the application of the triplestore mapping operation comprising determining if a mapping includes a structured query language (SQL) expression and on condition that the mapping includes a SQL expression, calling a SQL processing engine to process the SQL expression but otherwise performing the generation of the equivalent triples directly in memory; and
    a data sink for receiving generated equivalent triples so that the triplestore data is synchronized in real time with the generic data records.

2. The system of claim 1, wherein the triplestore database comprises one of: a triplestore data sink; a triplestore database system; storage queue; or an extract transform load (ETL) queue.

3. The system of claim 1, wherein two or more triples are created for each data event according to relational database to resource descriptor framework mapping language (R2RML) mappings.

4. The system of claim 3, wherein the data event is one or more of:
    an insert event;
    a delete event; or
    an update event.

5. The system of claim 1, wherein triplestore data is injected into the triplestore storage using a known application programming interface (API).

6. The system of claim 1, wherein data events include events from one or more of the following:
    database replication;
    data modification;
    change data capture (CDC) events;
    events from platform message queues or virtual machine queues;
    events from extract transfer load (ETL) jobs;
    events from structured query language (SQL) replication; and
    events from any streaming technology.

7. The system of claim 1, wherein the method is scaled for listening to multiple data event sources simultaneously.

8. A method of replicating a triplestore data from generic data records, implemented by a computing processor, comprising:
    listening for data events from the generic data record;
    matching each data event to a triplestore mapping operation;
    generating equivalent triples for each located data event by applying the triplestore mapping operation, the application of the triplestore mapping operation comprising determining if a mapping includes a structured query language (SQL) expression and on condition that the mapping includes a SQL expression, calling a SQL processing engine to process the SQL expression but otherwise performing the generation of the equivalent triples directly in memory; and pushing the generated equivalent triples into a triplestore data sink so that the triplestore data is synchronized in real time with the generic data records.

9. The method of claim 8, wherein the triplestore database comprises one of: a triplestore data sink; a triplestore database system; storage queue; or an extract transform load (ETL) queue.

10. The method of claim 8, wherein two or more triples are created for each data event according to relational database to resource descriptor framework mapping language (R2RML) mappings.

11. The method of claim 10, wherein the data event is one or more of:
an insert event;
a delete event; or
an update event.

12. The method of claim 8, wherein triplestore data is injected into the triplestore storage using a known application programming interface (API).

13. The method of claim 8, wherein data events include events from one or more of the following:
database replication;
data modification;
change data capture (CDC) events;
events from platform message queues or virtual machine queues;
events from extract transfer load (ETL) jobs;
events from structured query language (SQL) replication; and
events from any streaming technology.

14. The method of claim 11, wherein the method is scaled for listening to multiple data event sources simultaneously.

15. A computer program product for replicating a triplestore data from a generic data record, the computer program product comprising a computer readable storage medium having program instructions embodied therewith, wherein the computer readable storage medium is not a transitory signal per se, the program instructions executable by a processor to cause the processor to perform a method comprising:

listening for data events from the generic data record;
matching each data event to a triplestore mapping operation;
generating equivalent triples for each located data event by applying the triplestore mapping operation, the application of the triplestore mapping operation comprising determining if a mapping includes a structured query language (SQL) expression and on condition that the mapping includes a SQL expression, calling a SQL processing engine to process the SQL expression but otherwise performing the generation of the equivalent triples directly in memory; and
pushing the generated equivalent triples into a triplestore data sink so that the triplestore data is synchronized in real time with the generic data records.

* * * * *